2 Sheets—Sheet 1.
W. GRISCOM & T. McFEELY.
Millstone Dressing-Machine.
No. 206,316. Patented July 23, 1878.
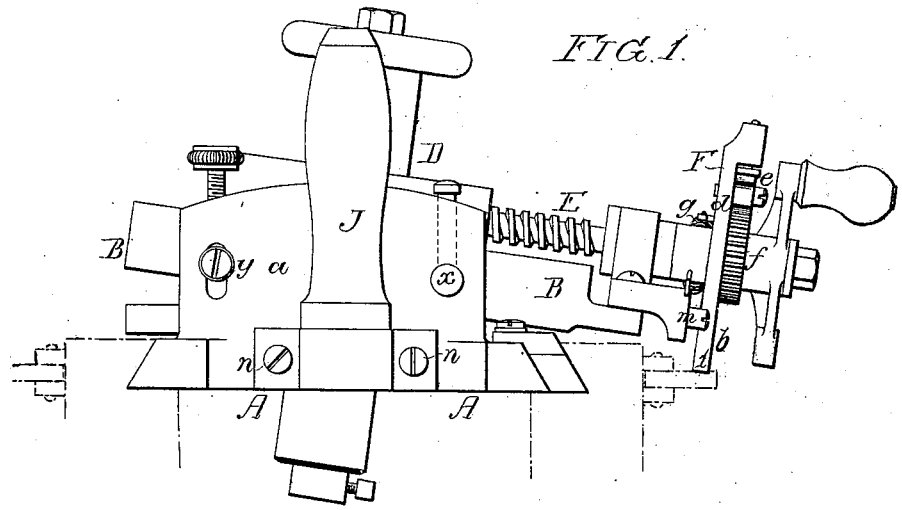
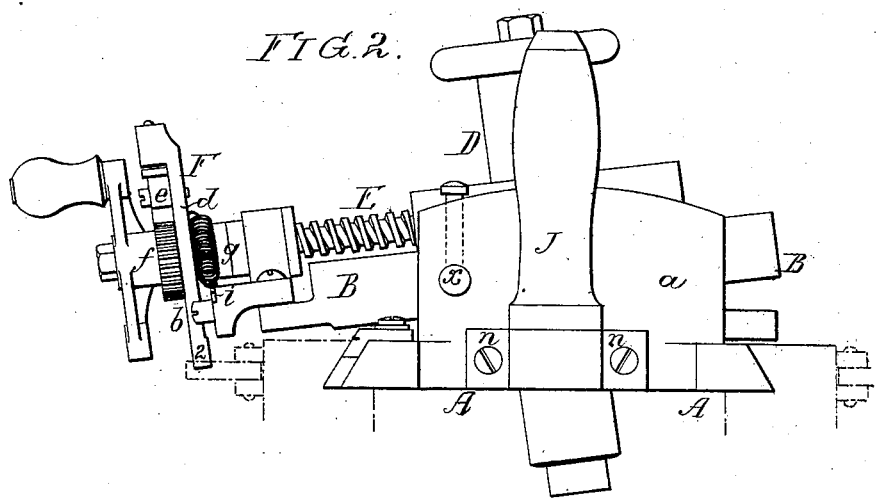
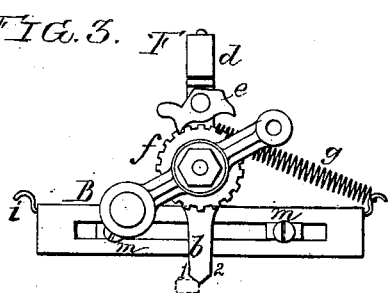
Witnesses,
Harry A. Crawford.
Harry Smith.
Inventor,
Walter Griscom
and
Thomas McFeely
by their Attorneys
Howson and Son 2 Sheets—Sheet 2.

W. GRISCOM & T. McFEELY.
Millstone Dressing-Machine.

No. 206,316. Patented July 23, 1878.

Witnesses.
Harry A. Crawford
Harry Smith

Inventor:
Walter Griscom
and
Thomas McFeely
by their Attorneys
Howson and Son

UNITED STATES PATENT OFFICE.

WALTER GRISCOM, OF POTTSVILLE, PA., AND THOMAS McFEELY, OF UNION CITY, IND., ASSIGNORS TO SAMUEL E. GRISCOM, OF POTTSVILLE, PA.

IMPROVEMENT IN MILLSTONE-DRESSING MACHINES.

Specification forming part of Letters Patent No. 206,316, dated July 23, 1878; application filed June 24, 1878.

*To all whom it may concern:*

Be it known that we, WALTER GRISCOM, of Pottsville, Schuylkill county, Pennsylvania, and THOMAS McFEELY, of Union City, Randolph county, Indiana, have invented a new and useful Improvement in Millstone-Dressing Machines, of which the following is a specification:

Our invention is an improvement upon the millstone-dressing machine for which Letters Patent of the United States No. 188,022 were granted to the assignee of Thomas McFeely on the 6th day of March, 1877; the object of our improvement being to so construct the machine that it can be used for cutting either vertical furrows or furrows inclined to the right or left.

This object we attain in the following manner, reference being had to the accompanying drawings, in which—

Figure 4:
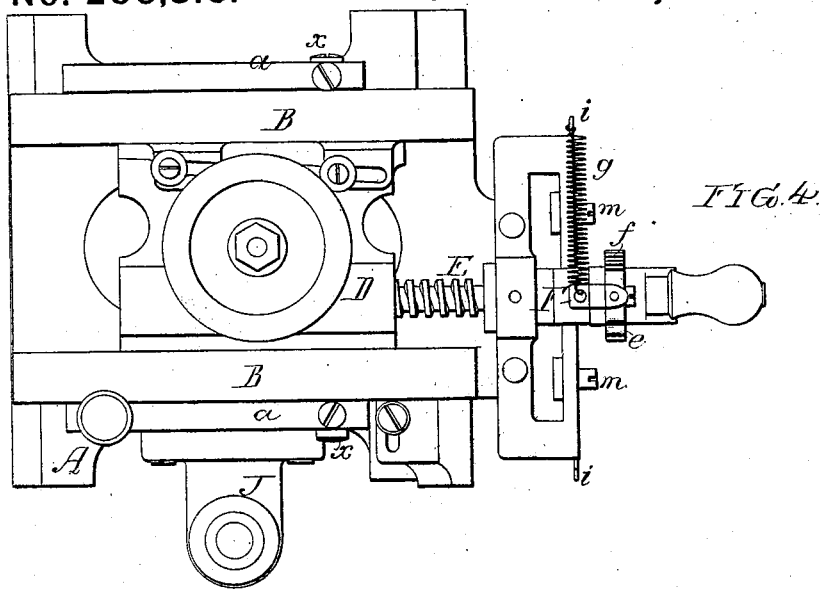

Figure 1, Sheet 1, is an end view of the machine as arranged for cutting a furrow inclined to the left; Fig. 2, the same as arranged for cutting a furrow inclined to the right; Fig. 3, an end view of the devices for operating the feed-screw; and Figs. 4 and 5, Sheet 2, plan views of Figs. 1 and 2, respectively.

A represents the sliding carriage of the machine, said carriage being adapted to guides in a suitable bed, as shown by dotted lines in Figs. 1 and 2. To bearings *a a* on this carriage is pivoted, at *x*, a frame, B, the outer end of which can be raised from a horizontal position, and secured after adjustment by a set-screw, *y*. To guides on this frame B is adapted the tool-carrying slide D, which is reciprocated by means of a feed-screw, E, the latter being adapted to a bearing on the frame B, and carrying at its outer end automatic devices, by which it is rotated, or partially rotated, at the end of each backward stroke of the carriage A.

These automatic rotating devices are shown most clearly in Fig. 3, Sheet 1, in which F represents a lever loosely hung to the projecting end of the stem E, the lower arm, *b*, of this lever projecting down into the path of a stud on the guiding-bed of the machine, while the upper arm of the lever carries a double pawl, *e*, which is acted upon by a suitable spring, so that either of its points may be adapted to the teeth of a ratchet, *f*, secured to the stem E, the teeth of said ratchet being abrupt on both faces, instead of being similar to ordinary ratchet-teeth. A handle is also connected to the end of the stem E, so that the latter may be turned independently of the pawl-and-ratchet mechanism.

A spring, *g*, is connected at one end to the arm *d* of the lever F, and is adapted at the other end to a hook, *i*, at one edge of the frame B, this spring serving to restore the lever F, after it has been released by the stud on the bed, to its normal position, which is determined by the contact of the arm *b* of the lever with an adjustable stop, *m*, on the frame B. There are two of these stops, one on each side of the lever F, and a hook, *i*, projects from each edge of the frame B, so that, supposing the device were arranged for operation by a stud acting on the face 1 of the lever F, as in Fig. 3, by simply shifting the pawl *e* and changing the point of connection of the spring *g* from one hook *i* to the other, the device would be adapted for operation by a stud acting on the face 2 of the lever F. The object of this will be best understood by referring to the following description of the operation of the machine. Supposing the parts to be in the position shown in Figs. 1 and 4—that is to say, with the pivoted frame B adjusted so that the tool is arranged to cut a furrow inclined at a certain angle to the left. In this case the lever F will be operated by a stud projecting from the right-hand side of the bed, and acting on the face 1 of the lever.

Figure 5:
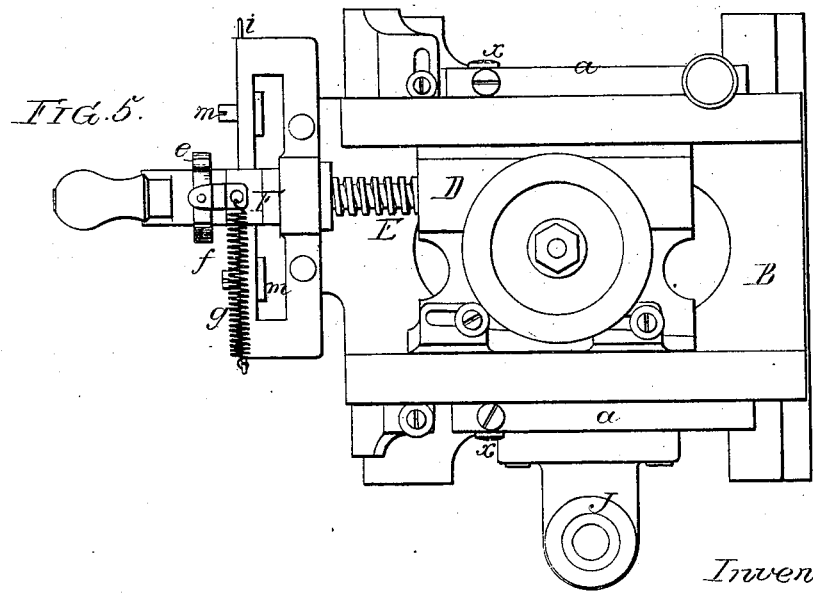

If it is desired to cut a furrow in the stone inclined at a similar angle to the right instead of to the left, we simply shift the pawl *e* and change the point of connection of the spring *g*, and then remove the carriage A from the bed, turn the outer end in, and replace it, as shown in Figs. 2 and 5. The cutting-tool is now inclined to the right, and the lever F is arranged for operation by a stud on the left-hand side of the bed, said stud acting on the face 2 of the lever.

We prefer to connect the operating-handle J to the carriage A by means of bolts *n n*, threaded openings adapted to the bolts being formed in each end of the carriage, so that the handle may be readily detached from one end and adapted to the other end when the position of the carriage is reversed, as described above.

A permanent handle at each end of the carriage could be used; but by making the handle J adjustable, we avoid the inconvenience and expense of two handles.

By making the carriage A reversible, and employing a duplex arrangement for operating the feed-screw E, we are enabled to adapt one machine to the cutting of vertical furrows or furrows inclined in either direction, thereby overcoming the necessity of using different machines, or hanging the frame B so that it can be tilted in either direction and secured in either position, as in the above-mentioned patent of McFeely, or in the patent of W. P. Uhlinger, No. 182,538, September 26, 1876.

We are aware that duplex ratchet devices for operating the feed-screw are shown in the patent of D. Larer, No. 144,851, November 25, 1873, and therefore do not claim this feature in itself; but

We claim as our invention—

The combination of the carriage A, having at each end a handle or means of attaching a handle, with the pivoted frame B, carrying the tool-slide D, and provided with duplex devices for operating the feed-screw, all substantially as and for the purpose herein set forth.

In testimony whereof we have signed our names to this specification in the presence of two subscribing witnesses.

WALTER GRISCOM.
THOS. McFEELY.

Witnesses to signature of Walter Griscom:
C. LITTLE,
FRANK LITTLE.
Witnesses to signature of Thomas McFeely:
C. A. HILL,
A. C. THROP.